(12) United States Patent
Chou

(10) Patent No.: US 7,980,416 B2
(45) Date of Patent: Jul. 19, 2011

(54) VEHICLE STORAGE BIN

(75) Inventor: Warren Jing Po Chou, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1053 days.

(21) Appl. No.: 11/769,197

(22) Filed: Jun. 27, 2007

(65) Prior Publication Data

US 2009/0001112 A1    Jan. 1, 2009

(51) Int. Cl.
*B65D 43/16*    (2006.01)
*B60R 7/06*    (2006.01)

(52) U.S. Cl. .............. 220/815; 220/840; 296/37.13; 224/483; 16/361

(58) Field of Classification Search .......... 220/811, 220/812, 815, 825, 840; 312/8.6, 8.11, 138.1, 312/270.2; 131/231; 296/37.13, 24.3, 24.34, 296/37.12; 224/277, 483; 16/357, 361
See application file for complete search history.

(56) References Cited

U.S. PATENT DOCUMENTS

| | | | |
|---|---|---|---|
| 447,532 A * | 3/1891 | Bacon | 312/270.2 |
| 2,408,460 A * | 10/1946 | Van Doren | 62/334 |
| 2,605,926 A * | 8/1952 | Casey | 220/840 |
| 2,617,702 A * | 11/1952 | Manning et al. | 312/296 |
| 2,812,097 A | 11/1957 | Legge | |
| 4,392,683 A | 7/1983 | Bassi et al. | |
| 4,496,050 A * | 1/1985 | Kirchner et al. | 206/753 |
| 4,676,544 A | 6/1987 | Dabringhaus et al. | |
| 4,765,346 A | 8/1988 | Simin | |
| 4,953,772 A | 9/1990 | Phifer | |
| 5,060,899 A | 10/1991 | Lorence et al. | |
| 5,061,133 A | 10/1991 | May et al. | |
| 5,199,449 A | 4/1993 | Dabringhaus et al. | |
| 5,381,586 A | 1/1995 | Busscher et al. | |
| 5,487,519 A | 1/1996 | Grabowski | |
| 5,645,340 A | 7/1997 | Colton | |
| 6,669,258 B1 | 12/2003 | Kato et al. | |
| 6,692,053 B1 | 2/2004 | Smith | |
| 6,926,332 B2 * | 8/2005 | Youngs et al. | 296/37.13 |
| 7,163,116 B2 | 1/2007 | Pandura et al. | |

* cited by examiner

*Primary Examiner* — Anthony Stashick
*Assistant Examiner* — James N Smalley
(74) *Attorney, Agent, or Firm* — Gifford, Krass, Sprinkle, Anderson & Citkowski, P.C.

(57) ABSTRACT

A storage bin assembly is for use in a passenger compartment of a motor vehicle includes a storage bin and a housing. The storage bin has a storage space extending between spaced apart sides, a guide pin extending outwardly from at least one of the sides of the storage bin, and a pair of retainer clips disposed on opposite sides of the storage bin. The housing has spaced apart side walls for receiving the storage bin therebetween, a pair of bosses each extending through one of the pair of retainer clips for pivotally interconnecting the bin to the housing for movement between open and closed positions relative to tile housing, and a track disposed on at least one of the side walls and in which the guide pin slides during the movement of the storage bin between the open and closed positions. Each of the retainer clips and the track has an open end facilitating removal of the storage bin from the housing and reinstallation of the bin to the housing.

8 Claims, 3 Drawing Sheets

VEHICLE STORAGE BIN

FIELD OF THE INVENTION

The invention relates to a storage bin for use in a passenger compartment of a motor vehicle.

BACKGROUND OF THE INVENTION

Motor vehicles typically include a storage bin or "glove box" disposed in an interior panel of a passenger compartment of the vehicle, such as an instrument panel or a center console. Glove boxes can become dirty during extended use. It remains desirable to provide an improved storage bin design that is easily repeatedly removed and reinstalled without tools, thereby minimizing wear, tear and/or damage to the storage bin or interior panel.

SUMMARY OF THE INVENTION

According to one aspect of the invention, a storage bin assembly is provided for use in a passenger compartment of a motor vehicle. The storage bin assembly includes a storage bin and a housing. The storage bin has a storage space extending between spaced apart sides, a guide pin extending outwardly from at least one of the sides of the storage bin, and a pair of retainer clips disposed on opposite sides of the storage bin. The housing has spaced apart side walls for receiving the storage bin therebetween, a pair of bosses each extending through one of the pair of retainer clips for pivotally interconnecting the bin to the housing for movement between open and closed positions relative to the housing, and a track disposed on at least one of the side walls and in which the guide pin slides during the movement of the storage bin between the open and closed positions. Each of the retainer clips and the track has an open end facilitating removal of the storage bin from the housing and reinstallation of the bin to the housing.

According to another aspect of the invention, a storage bin assembly is provided for use in a passenger compartment of a motor vehicle. The storage bin assembly includes a storage bin having a storage space and that is pivotally interconnected to a housing for movement between an open position extending from the housing to provide access to the storage space and a closed position disposed in the housing to conceal the storage space. The pivotal interconnection is formed by a boss extending from one of the storage bin and the housing and a retainer clip extending from the other of the storage bin and the housing. The pivotal movement of the storage bin is guided by a track disposed on one of the storage bin and the housing and a guide pin slidably engaged to the track and extending from the other of the storage bin and the housing. Both the retainer clip and the track have an open end facilitating removal of the storage bin from the housing and reinstallation of the bin to the housing.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
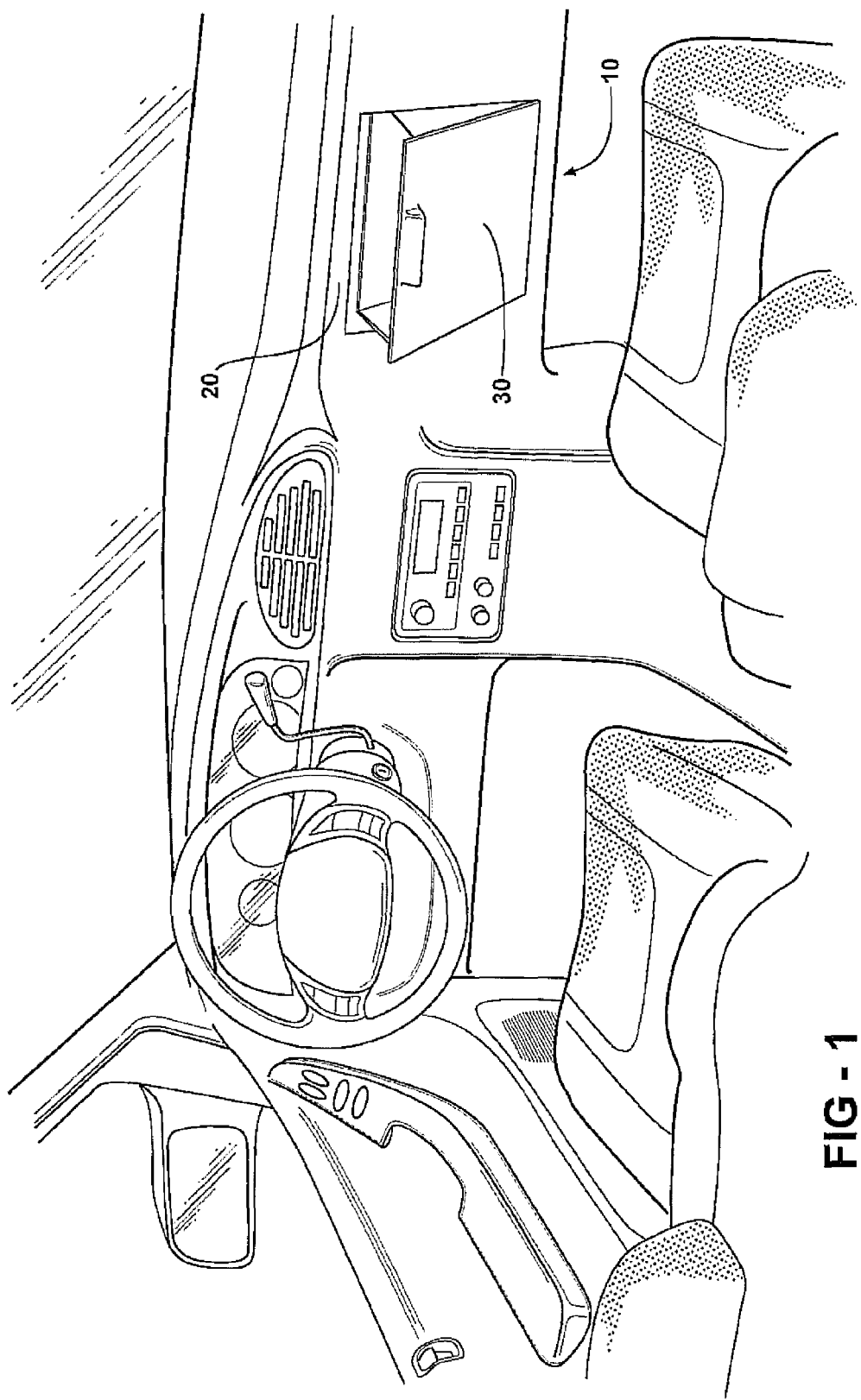
FIG. 1 is a front perspective view of a storage bin assembly according to one embodiment of the invention.
Figure 2:
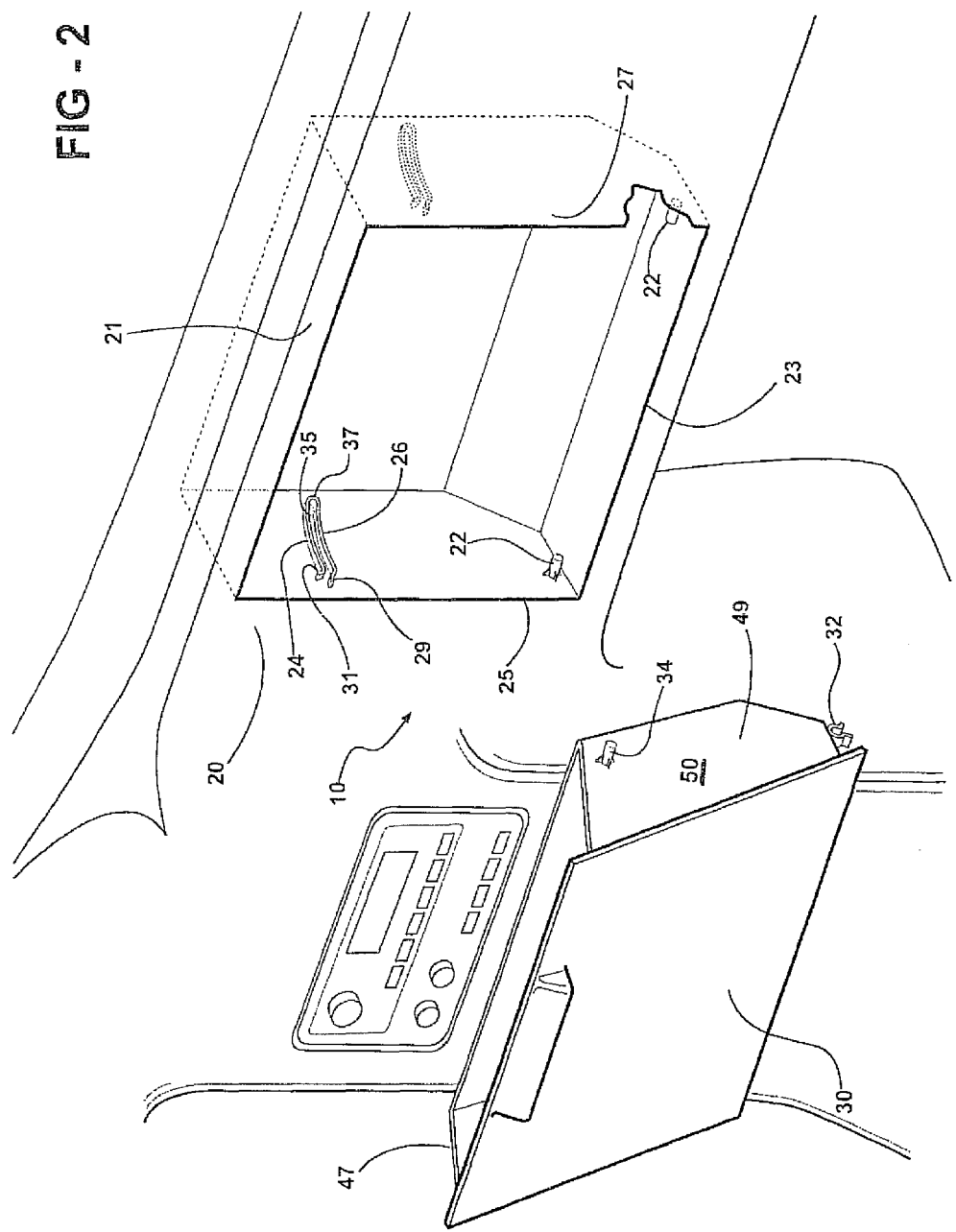
FIG. 2 is a side cross sectional view of the bin assembly of FIG. 1.
Figure 3:
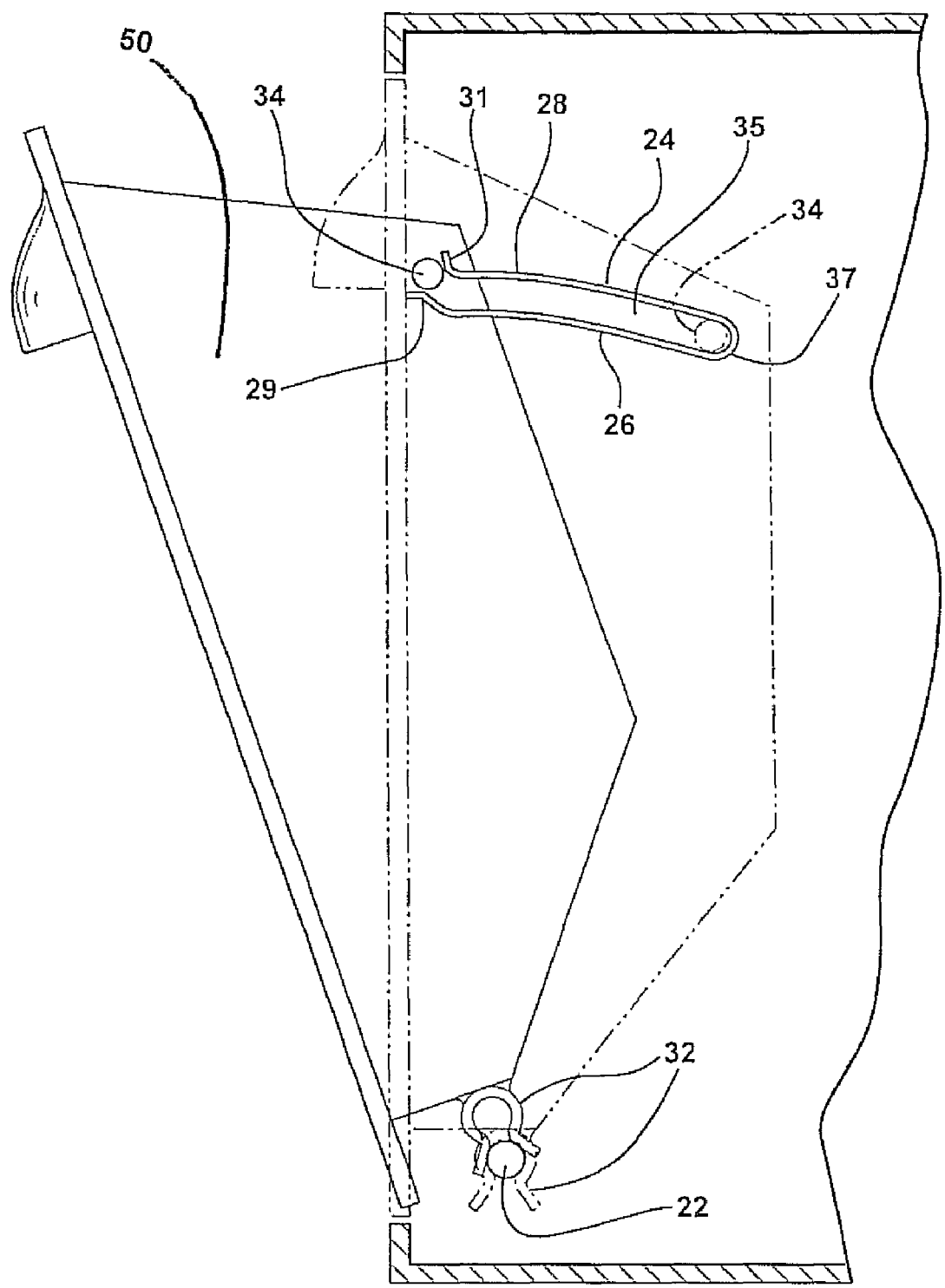
FIG. 3 is an exploded perspective view of the bin assembly of FIG. 1.

Referring to FIG. 1, a storage bin assembly for use in a motor vehicle is generally indicated at 10. The bin assembly 10 includes a housing 20 and a bin 30 pivotally coupled to the housing 20 for movement between open and closed positions. In one embodiment, the housing 20 and bin 30 are mold formed out of plastic. The housing 20 has a top wall 21, a bottom wall 23 and side walls 25, 27 arranged generally orthogonally to each other to define a generally rectangular recess 29 for receiving the bin 30. The bin 30 includes an external surface 50 including opposite sides 47, 49. A boss 22 extends outwardly from an inner surface 31, 33 of each side wall 25, 27. The bosses 22 are generally axially aligned to define a pivot axis for the bin 30.

At least one of the side walls 25, 27 includes guide edges or walls 24, 26 formed along the inner surface 31, 33 thereof. The guide walls 24, 26 are arcuate and generally centered about the bosses 22. The guide walls 24, 26 are spaced apart and generally parallel to define a track 35 for receiving an outwardly extending guide pin 34 from the bin 30. The guide pin 34 is slidably engaged to the track 35 to guide pivotal movement of the bin 30 relative to the housing 20. The guide walls 24, 26 intersect and form a generally U-shaped closed end 37 that limits travel of the guide pin 34 along the track 35 and, in turn, inward movement of the bin 30 relative to the housing 20. The guide walls 24, 26 have terminal ends 29, 31 opposite the closed end 37. The terminal ends 29, 31 are angled outwardly in generally opposite directions from the track 35 for guiding the guide pin 34 toward the track 35 during assembly of the bin 30 to the housing 20. In the illustrated embodiment, the track 35 and guide pin 34 arrangement described above is provided on both opposite sides of the housing and bin, respectively.

Key-hole shaped retainer clips 32 are disposed along opposite sides 47, 49 of the external surface 50 of the bin 30. Each retainer clip 32 includes a circular portion 41 that is pivotally coupled to a respective boss 22 when the bin 30 is assembled to the housing 20. Each retainer clip 32 is also open ended to allow insertion of the bosses 22 into the circular portion 41. Each retainer clip 32 includes terminal ends 43, 45 that are angled outwardly apart from each other for guiding each boss 22 during insertion into the circular portion 41.

During assembly, the bin 30 is positioned partially into the recess 29 of the housing 20, such that the guide pin 34 is positioned between the terminal ends 29, 31 of the guide walls 24, 26 and the bosses are positioned between the terminal ends 43, 45 of the retainer clips 32. The terminal ends 29, 31, 43, 45 are angled such that pushing the bin 30 downwardly and toward the housing 20 causes the insertion of the guide pin 34 into the track 35 and the bosses 22 into the circular portions 41. In one embodiment of the invention, the terminal ends 29, 31, 43, 45 are oriented such that the insertion angles for the guide pin 34 into the track 35 and the bosses 22 into the circular portion 41 are substantially the same. The bin 30 and the housing 20 are pivotally coupled to each other with the bosses 22 seated in the circular portions 41 of the retainer clips 32. The bosses 22 are retained in the circular portions 41 of the retainer clips 32, as the guide pin 34 is retained in a generally radial direction between the guide walls 24, 26 of the track 35. The bin 30 is easily removed and reinstalled to the housing by reversing and repeating the aforementioned assembly steps.

In use, the bin 30 is movable to the open position to allow access to the storage space. The bin 30 is also movable to the closed position disposed in the housing 20 to conceal and prevent access to the storage space. The pivotal movement of the bin 30 relative to the housing 20 between the open and closed positions is guided by the sliding movement of the guide pin 34 along the track 35. Contact between the guide pin 34 and the terminal end 29 of the lower guide wall 26 provides a hard stop that defines the open position of the bin 30. Contact between the guide pin 34 and the closed end 37 of the track 35 provides a hard stop that defines the closed position of the bin.

Alternatively, the retainer clips may extend from the side walls of the housing and the bosses may extend outwardly from the opposite sides of the bin. Alternatively, at least one of the sides of the bin includes the track and the guide pin extends from the housing into the track for guiding tie movement of the storage bin between open and closed positions, as earlier described.

The invention has been described in an illustrative manner. It is, therefore, to be understood that tie terminology used is intended to be in the nature of words of description rather than of limitation. Many modifications and variations of the invention are possible in light of the above teachings. Thus, within the scope of the appended claims, the invention may be practiced other than as specifically described.

I claim:

1. A storage bin assembly for use in a passenger compartment of a motor vehicle, said storage bin assembly comprising:
    a storage bin having an external surface;
    a housing having an opening for receiving the storage bin, the housing further including a pair of side walls, the storage bin removably mounted between the pair of side walls;
    at least one retainer clip disposed on either the external surface of the storage bin or the side wall of the housing, at least one boss extending from the other of the external surface of the storage bin or the side wall of the housing, the side wall in a plane normal to the at least one boss, the boss extending through the at least one retainer clip for pivotally interconnecting the storage bin to the housing for movement between open and closed positions relative to the housing, the retainer clip having an open end facilitating removal of the storage bin from the housing and reinstallation of the storage bin to the housing; and
    a track comprising spaces apart upper and lower guide walls disposed on either the external surface of the storage bin or the side wall of the housing, a guide pin extending from the other of the external surface of the storage bin or the side wall of the housing, the guide pin slides between the upper and lower guide walls of the track during the movement of the storage bin between the open and closed positions, the track having an open end opening towards the opening of the housing facilitating removal of the guide pin from the track and reinstallation of the bin to the housing track.

2. A storage bin assembly as set forth in claim 1, wherein the guide walls intersect to form a closed end that contacts the guide pin and locates the storage bin relative to the housing in the closed position.

3. A storage bin assembly as set forth in claim 2, wherein the guide walls include terminal ends that are angled outwardly from each other for guiding the guide pin toward the track during assembly of the storage bin and the housing.

4. A storage bin assembly as set forth in claim 2, wherein the lower guide wall includes a terminal end with a portion that is formed to contact the guide pin and prevent rotation of the storage beyond the open position as the storage bin is moved from the closed position toward the open position.

5. A storage bin assembly as set forth in claim 3, wherein the retainer clip includes spaced apart terminal ends that are angled apart from each other for guiding the boss into the retainer clip during assembly of the storage bin and the housing.

6. A storage bin assembly as set forth in claim 5, wherein the terminal ends of the guide walls and the retainer clips extend in generally different directions to facilitate installation and removal of the storage bin from the housing.

7. A storage bin assembly as set forth in claim 2, wherein the guide walls are arcuate and generally centered about a storage bin pivot axis extending through the pair of bosses.

8. A storage bin assembly as set forth in claim 2, wherein the guide walls protrude away from either the external surface of the storage bin or on the side wall of the housing.

* * * * *